US010752537B2

(12) United States Patent
Ellison

(10) Patent No.: US 10,752,537 B2
(45) Date of Patent: Aug. 25, 2020

(54) MINERAL FIBERS

(71) Applicant: SAINT-GOBAIN ISOVER, Courbevoie (FR)

(72) Inventor: Christopher Ellison, Varengeville sur Mer (FR)

(73) Assignee: SAINT-GOBAIN ISOVER, Courbevoie (FR)

(*) Notice: Subject to any disclaimer, the term of this patent is extended or adjusted under 35 U.S.C. 154(b) by 18 days.

(21) Appl. No.: 15/766,538

(22) PCT Filed: Oct. 6, 2016

(86) PCT No.: PCT/FR2016/052582
§ 371 (c)(1),
(2) Date: Apr. 6, 2018

(87) PCT Pub. No.: WO2017/060637
PCT Pub. Date: Apr. 13, 2017

(65) Prior Publication Data
US 2018/0290920 A1    Oct. 11, 2018

(30) Foreign Application Priority Data
Oct. 8, 2015  (FR) ..................... 15 59582

(51) Int. Cl.
C03C 13/00    (2006.01)
C03C 13/06    (2006.01)
C03B 5/235    (2006.01)
C03B 37/04    (2006.01)
D01F 9/08     (2006.01)
C03C 3/097    (2006.01)
C03B 37/01    (2006.01)
C03C 3/062    (2006.01)

(52) U.S. Cl.
CPC ............ C03C 13/06 (2013.01); C03B 5/2356 (2013.01); C03B 37/01 (2013.01); C03B 37/04 (2013.01); C03C 3/062 (2013.01); C03C 3/097 (2013.01); D01F 9/08 (2013.01)

(58) Field of Classification Search
CPC ................ C03C 13/00; C03C 13/06
See application file for complete search history.

(56) References Cited

U.S. PATENT DOCUMENTS

| | | | |
|---|---|---|---|
| 3,929,497 A | | 12/1975 | Clark-Monks |
| 5,131,935 A | * | 7/1992 | Debouzie .............. C03B 37/055 65/456 |
| 2007/0292303 A1 | | 12/2007 | Berthod et al. |
| 2014/0357469 A1 | | 12/2014 | Beaufils et al. |
| 2015/0175464 A1 | * | 6/2015 | Lefrere .................. C03B 5/04 65/135.1 |

FOREIGN PATENT DOCUMENTS

| | | |
|---|---|---|
| CN | 1 566 005 A | 1/2005 |
| EP | 0 439 385 A1 | 7/1991 |
| EP | 0 465 310 A1 | 1/1992 |
| GB | 2 152 026 A | 7/1985 |
| WO | WO 99/56525 A1 | 11/1999 |
| WO | WO 2013/117851 A1 | 8/2013 |
| WO | WO 2013/132184 A1 | 9/2013 |
| WO | WO 2013/186480 A1 | 12/2013 |

OTHER PUBLICATIONS

Manutchehr-Danai, Moshsen, Dictionary of Gems and Gemology, 2005, Springer, pp. Intro, 6, 8, 115-117, 148, 384, 385, 425, 593, 594, 618-625. (Year: 2005).*
Shelby, James E., Introduction to Glass Science and Technology, 1997, The Royal Society of Chemistry,pp. Intro, 24-47. (Year: 1997).*
International Search Report as issued in International Patent Application No. PCT/FR2016/052582, dated Dec. 22, 2016.
Database WPI, Week 200610, Jan. 2005, Thomson Scientific, AN 2006-090967, XP002759312.

* cited by examiner

Primary Examiner — Elizabeth A. Bolden
(74) Attorney, Agent, or Firm — Pillsbury Winthrop Shaw Pittman LLP

(57) ABSTRACT

Mineral fibers have a chemical composition including the following constituents, as weight percentages: $SiO_2$ 30% to 50%, $Al_2O_3$ 10% to 20%, CaO+MgO 20% to 35%, $Na_2O$+$K_2O$ 1% to 10%, wherein the mineral fibers include a content of total iron, expressed as $Fe_2O_3$, of from 5% to 15% and a redox, which corresponds to the weight ratio between the content of ferrous iron, expressed as $Fe_2O_3$, and the total content of iron, expressed as $Fe_2O_3$, of less than 0.6.

19 Claims, No Drawings

MINERAL FIBERS

CROSS-REFERENCE TO RELATED APPLICATIONS

This application is the U.S. National Stage of PCT/FR2016/052582, filed Oct. 6, 2016, which in turn claims priority to French patent application number 1559582 filed Oct. 8, 2015. The content of these applications are incorporated herein by reference in their entireties.

The present invention relates to the field of artificial mineral fibers. It targets more particularly the mineral fibers intended to manufacture thermal and/or acoustic insulation materials. It relates more particularly to glassy mineral fibers of rock fiber type.

For certain insulation applications, the mineral fibers may remain visible. This is the case for example for sprayable wools, applied in the form of a mixture of mineral fibers and of one or more binders, used in particular for the thermal and acoustic insulation of the bottom floors in unheated premises such as underground parking lots. For such applications, it is customary that the mineral fibers have a weak and uniform coloration in order to guarantee the esthetic qualities of the sprayable wools.

The mineral fibers of slag wools are, as their name indicates, obtained from raw materials for the most part formed of blast furnace slags. They consequently comprise a low iron content, typically less than 1%, and a large amount of lime. This high proportion of slags makes it possible to obtain fibers that are colored very little. Slag wools are therefore widely used for applications where the mineral fibers may remain visible, such as sprayable wools. Nevertheless, the use of large amounts of slags gives rise to fly ash comprising emissions of $SO_x$ during the raw material melting step. This fly ash must be treated in order to guarantee the sanitary and/or environmental safety of the industrial discharges, which results in an additional production cost.

Furthermore, the biosoluble nature is, as for all artificial mineral fibers, an important criterion for the choice of the mineral fibers used for the sprayable wools. The mineral fibers should be able to dissolve rapidly in a physiological medium in order to prevent any potential pathogen risk linked to the possible accumulation of the finest fibers in the body via inhalation.

The improvement in the fire resistance properties is also an important criterion within the context of the thermal and/or acoustic insulation of buildings, which is subject to ever more demanding regulations. It is known to increase the content of iron in the compositions of mineral fibers in order to improve the fire resistance properties thereof. However, the increase in the iron contents has a tendency to color the mineral fibers, which is not desired, in particular for applications where the mineral fibers remain visible.

The present invention proposes to improve the fire resistance of mineral fibers that may be used to form mineral wool products, in particular but nonlimitingly in sprayable wool applications, while limiting the coloration thereof. The applicant observed that it was possible to arrive at this compromise by controlling the degree of oxidation-reduction of the mineral fibers. Another object of the present invention is to propose mineral fibers having good biosolubility properties. Another object of the present invention is to minimize $SO_x$ emissions during the manufacture of the mineral fibers.

Thus, the present invention relates to mineral fibers having a chemical composition comprising the following constituents, as weight percentages:

| | |
|---|---|
| $SiO_2$ | 30% to 50% |
| $Al_2O_3$ | 10% to 20% |
| CaO + MgO | 20% to 35% |
| $Na_2O + K_2O$ | 1% to 10% | characterized in that said mineral fibers comprise a content of total iron, expressed as $Fe_2O_3$, of from 5% to 15% and a redox, which corresponds to the weight ratio between the content of ferrous iron, expressed as $Fe_2O_3$, and the total content of iron, expressed as $Fe_2O_3$, of less than 0.6, preferably of less than 0.5, more preferentially of less than 0.4.

Throughout the present text, the contents are expressed as weight percentages.

The content of silica ($SiO_2$) is advantageously within a range extending from 35% to 45%, more particularly from 38% to 44%.

The content of alumina ($Al_2O_3$) is advantageously within a range extending from 13% to 17%.

The content of lime (CaO) is preferably within a range extending from 5%, or even 10%, 12% or 15% to 25%, or even 20%, or 18%, in particular from 10% to 20% or from 12% to 18%. The content of magnesia (MgO) is preferably within a range extending from 5%, or even 7%, 7.5% or 8% to 25%, or even 20%, 15% or 13%, in particular from 5% to 15%, from 7.5% to 15% or from 8% to 13%. The sum of the contents of lime and magnesia is itself preferably within a range extending from 25%, or even 25.5% or 27.5% to 33%, or even 32% or 31%, in particular from 25.5% to 32% or from 27.5% to 31%.

Preferably, the content of barium oxide (BaO) is at most 1%, in particular 0.5%, or even 0.1%. The content of manganese oxide (MnO) is at most 1%, in particular within a range extending from 0.05% to 0.5%, or even 0.1% to 0.3%. The content of strontium oxide (SrO) is itself preferably at most 1%, or even 0.5% and even 0.1% or else zero.

The total content of alkali metal oxides (soda and potash —$Na_2O+K_2O$) is preferably within a range extending from 2%, or even 3.5% to 6%, or even 5%. The content of $Na_2O$ is advantageously at most 6%, in particular within a range extending from 0.1%, or even 1% to 5%, or even 4%. The content of $K_2O$ is itself advantageously at most 6%, in particular within a range extending from 0.1%, or even 0.5% to 5%, or even 3%. The mineral wool preferably comprises no alkali metal oxide other than $Na_2O$ and $K_2O$. It may nevertheless contain small amounts of $Li_2O$, sometimes present as impurities in certain feldspars.

Titanium oxide ($TiO_2$) provides a very noticeable effect on the high- and low-temperature nucleation of spinels in the glassy matrix. The content of $TiO_2$ is preferably within a range extending from 0.1% to 3%, in particular from 0.5% to 2.5%.

Iron oxide ($Fe_2O_3$) has a positive impact on the fire resistance of the mineral fibers. Its total content (expressed in the form $Fe_2O_3$, whether the iron is in ferric or ferrous form) is preferably at least 7%, or even 8% and/or at most 13% or 12%. The redox, which corresponds to the weight ratio between the content of ferrous iron ($Fe^{2+}$), expressed as $Fe_2O_3$, and the total content of iron, expressed as $Fe_2O_3$, is preferably within a range extending from 0.1% to 0.5%. The weight ratio of the content of ferric iron ($Fe^{3+}$), expressed as $Fe_2O_3$, relative to the content of total iron, expressed as $Fe_2O_3$, is preferably greater than 0.4, in particular greater than 0.5, or even greater than 0.6. One of the additional advantages of the low redox is to avoid the formation of cast iron in the melting tank, which makes it possible to improve the safety conditions and the efficiency of the process. The operations for emptying the melting tank, necessary when the process produces cast iron, are in fact dangerous and require the shutdown of the production.

The composition of the mineral wool according to the invention may also contain $P_2O_5$, in particular at contents between 0 and 3%, or even between 0 and 1.2% to increase the biosolubility at neutral pH.

It goes without saying that the various preferred ranges described above may be combined freely with one another, the various combinations not all being able to be listed for reasons of conciseness.

Several preferred combinations are described below.

According to one preferred embodiment, the mineral fibers according to the invention have a chemical composition comprising the following constituents, as weight percentages:

| | |
|---|---|
| $SiO_2$ | 35% to 45% |
| $Al_2O_3$ | 13% to 20% |
| CaO + MgO | 25% to 33%, preferably 25.5% to 33% |
| $Na_2O + K_2O$ | 1% to 6%, preferably 3.5% to 6% |
| $TiO_2$ | 0.1% to 3% | characterized in that said mineral fibers comprise a content of total iron, expressed as $Fe_2O_3$, of from 7% to 13% and a redox of less than 0.6, preferably less than 0.5, more preferentially of less than 0.4.

This range is particularly preferred since it encompasses biosoluble compositions according to European directive 97/67/EC.

According to one particularly preferred embodiment, the mineral fibers according to the invention have a chemical composition comprising the following constituents, as weight percentages:

| | |
|---|---|
| $SiO_2$ | 38% to 44% |
| $Al_2O_3$ | 13% to 17% |
| CaO + MgO | 25% to 31%, preferably 25.5% to 31% |
| $Na_2O + K_2O$ | 2% to 6%, preferably 3.5% to 6% |
| $TiO_2$ | 0.5% to 2.5% | characterized in that said mineral fibers comprise a content of total iron, expressed as $Fe_2O_3$, of from 8% to 12% and a redox of less than 0.6, preferably less than 0.5, more preferentially of less than 0.4.

Another subject of the invention is a process for obtaining mineral fibers according to the invention, comprising a step of melting a batch mix having substantially the same chemical composition as that of said mineral fibers; then a step of fiberizing, in particular by an external centrifugation process.

The melting step makes it possible to obtain a molten bath from a batch mix comprising a majority portion of rocks, for example more than 60%, in particular more than 70%, or even more than 80% or more than 90%. The rocks may be chosen for example from basalt, feldspar, diabase, peridotite, pyroxenite, apatite, bauxite, dolomite, iron ores, limestone, rutile, magnesite, magnetite and brucite as a function of the desired composition.

The batch mix may comprise a minority proportion of slags, for example less than 40%, in particular less than 30%, or even less than 20% or less than 10%. It is advantageously free of slag in order to avoid the emissions of undesirable residual gases during the melting of the batch material.

The melting of the rock-based raw materials used for the manufacture of the mineral fibers is conventionally carried out in coke-fired cupola type furnaces. These melting conditions create a reducing environment. The applicant has observed that, on the contrary, the melting of rock-based batch mixes under oxidizing conditions (that is to say so that the redox of the molten bath is less than 0.6) makes it possible to obtain mineral fibers that are not very colored despite the presence of a relatively large amount of iron in the mix.

The melting step may be carried out in various known ways, in particular by melting in a fuel-fired furnace or by electric melting.

In an electric furnace, the batch mix is melted by the Joule effect, using electrodes submerged in the molten bath, with exclusion of any use of other heating means, such as flames. The electrodes may be suspended so as to drop into the molten bath from above or else be installed in the side walls of the tank. The first option is generally preferred for large-sized tanks in order to distribute the heating of the glass bath as best possible. The electrodes are preferably made of molybdenum, or even optionally of tin oxide.

The fuel-fired furnaces comprise at least one overhead or submerged burner. In a furnace with overhead burners, the flames are positioned above the molten bath and heat it via radiation. In a furnace with submerged burners, the flames are created directly within the molten bath, which allows a more efficient energy exchange. The or each burner is supplied by an air/fuel or oxygen/fuel mixture, various fuels being able to be used such as natural gas or fuel oil.

The melting step may also carry out both a flame melting and an electric melting, for example by using a fuel-fired furnace also provided with electrodes in the side walls used to accelerate the melting of the batch mix.

The furnaces mentioned above make it possible to create more or less oxidizing melting conditions. It is however possible, if necessary, to adjust the redox of the molten bath. The process involves the continuous melting of a composition comprising the batch mix preferably in a submerged-burner furnace. Submerged-burner furnaces suitable for the present invention are for example described in applications WO 2013/186480, WO 2013/132184 and WO 2013/117851 incorporated by reference into the present application. The submerged burners have the dual role of heating the batch materials and of homogenizing the composition. The raw materials may be ground or micronized before they are introduced into the furnace. However, owing to the effectiveness of the submerged burners, the furnace may also be supplied with natural raw materials of relatively coarse particle size. The furnace preferably comprises bare metal walls, i.e. walls that are not protected by refractory materials, through which a system of internal ducts passes, in which ducts a coolant, for example water, is circulated. In a furnace of this type, referred to as a waterjacket furnace, a solid layer of more or less devitrified material forms at the interface between the liquid bath and the cooled walls and protects the latter against wear and oxidation. The furnace preferably comprises two tanks in series. The first tank, referred to as melting tank, is a waterjacket type tank comprising a batch material inlet, a plurality of submerged burners that make it possible to heat the batch materials until a liquid bath is obtained and an outlet of the liquid bath. The inlet of the first tank is advantageously provided with a batch charger as described in WO 2013/132184. The second tank, referred to as heating tank, is also a waterjacket type tank comprising at least one submerged burner. The second tank enables the heating of the liquid bath at temperatures sufficient for enabling the fiberizing operations.

The fiberizing step is preferably carried out by external centrifugation using a cascade of spinning wheels supplied with molten material by a dispensing device, as described for example in applications EP 0 465 310 or EP 0 439 385 incorporated by reference into the present application.

The fibers obtained may be packaged loose or in bales for blowable wool or sprayable wool applications. In the latter case, the mineral fibers are combined with a binder during the application thereof. The fibers obtained may also be bound together using a binding compound sprayed onto their surface, before being received and shaped in order to give various mineral wool products, such as rolls or panels.

Another subject of the invention is a thermal and/or insulation product comprising mineral fibers according to the invention. Such a product may in particular be in the form of ready-to-use sprayable mixtures. The insulation product may also be in the form of rolls or panels. Such a product is particularly suitable, without however being limited thereto, for applications where the insulation product, and more particularly the mineral fibers, remain visible. It may be used, for example, in buildings, in industry or in means of transport, in particular railroad or maritime transport. More generally, the product according to the invention may be used to thermally or acoustically insulate any type of building, whether service industry or dwelling (multi-unit or individual). It may for example be used in external insulation systems, for insulating timber frame houses, in sandwich panels, in ventilation ducts, etc.

The mineral fibers according to the invention have an improved fire resistance, in particular relative to the slag wools conventionally used for spraying applications, while retaining a weak coloration. Preferred fibers according to the invention furthermore have an advantageous biosolubility. Lastly, the reduction in the amounts of slag, or even the absence of slag, used for the manufacture of the fibers according to the invention, makes it possible to significantly reduce the $SO_x$ emissions from the melting of the raw materials, which simultaneously reduces the health and/or environmental risks and the costs of treatments linked to these emissions.

The following examples illustrate the invention in a nonlimiting manner.

A batch mix based on basalt, on bauxite, on diabase, on dolomite and free of slag was melted in a submerged-burner furnace. The molten bath was fiberized by external centrifugation to obtain mineral fibers having a chemical composition comprising the following constituents, as weight percentages:

| | |
|---|---|
| $SiO_2$ | 39.7% |
| $Al_2O_3$ | 15.3% |
| CaO | 17.5% |
| MgO | 10.6% |
| $Fe_2O_3$ | 10.4% |
| $Na_2O$ | 3.05% |
| $K_2O$ | 0.92% |
| $TiO_2$ | 1.69% |
| $P_2O_3$ | 0.32% |
| MnO | 0.15% |
| SrO | 0.04% | and having a redox of 0.38.

The fibers obtained have a weak and uniform coloration and also good fire resistance.

The invention claimed is:

1. Mineral fibers having a chemical composition comprising the following constituents, as weight percentages:

| | |
|---|---|
| $SiO_2$ | 30% to 50% |
| $Al_2O_3$ | 10% to 20% |
| CaO + MgO | 20% to 35% |
| $Na_2O + K_2O$ | 1% to 10% | wherein said mineral fibers comprise a content of total iron, expressed as $Fe_2O_3$, of from 5% to 15% and a redox, which corresponds to a weight ratio between the content of ferrous iron, expressed as $Fe_2O_3$, and the total content of iron, expressed as $Fe_2O_3$, of less than 0.6.

2. The mineral fibers as claimed in claim 1, wherein said mineral fibers have a redox of less than 0.4.

3. The mineral fibers as claimed in claim 1, wherein said mineral fibers have a redox of less than 0.5.

4. The mineral fibers as claimed in claim 1, wherein said mineral fibers comprise a weight ratio between the content of ferric iron, expressed as $Fe_2O_3$, and the content of total iron, expressed as $Fe_2O_3$, of greater than 0.4.

5. The mineral fibers as claimed in claim 4, wherein the weight ratio between the content of ferric iron, expressed as $Fe_2O_3$, and the content of total iron, expressed as $Fe_2O_3$ is greater than 0.5.

6. The mineral fibers as claimed in claim 5, wherein the weight ratio between the content of ferric iron, expressed as $Fe_2O_3$, and the content of total iron, expressed as $Fe_2O_3$ is greater than 0.6.

7. The mineral fibers as claimed in claim 1, wherein said mineral fibers comprise a content of total iron, expressed as $Fe_2O_3$, of from 7% to 13%.

8. The mineral fibers as claimed in claim 7, wherein the content of total iron, expressed as $Fe_2O_3$, is from 8% to 12%.

9. The mineral fibers as claimed in claim 1, wherein said mineral fibers comprise a content of $Al_2O_3$ of from 13% to 17%.

10. The mineral fibers as claimed in claim 1, wherein said mineral fibers comprise a content of CaO+MgO of from 27.5% to 35%.

11. The mineral fibers as claimed in claim 1, wherein said mineral fibers comprise a content of CaO of from 12% to 18%.

12. The mineral fibers as claimed in claim 1, wherein said mineral fibers comprise a content of MgO of 7 to 25%.

13. The mineral fibers as claimed in claim 1, wherein said mineral fibers comprise a content of MgO of from 7.5% to 13%.

14. The mineral fibers as claimed in claim 1, wherein said mineral fibers comprise a content of $Na_2O+K_2O$ of from 3.5% to 6%.

15. The mineral fibers as claimed in claim 1, wherein said mineral fibers comprise a content of $Na_2O$ of at most 6%.

16. A process for manufacturing mineral fibers as defined in claim 1, comprising a step of melting a batch mix having substantially the same chemical composition as that of said mineral fibers; then a step of fiberizing.

17. The process as claimed in claim 16, wherein the batch mix is devoid of slag.

18. The process as claimed in claim 16, wherein the melting step is carried out in a submerged-burner furnace.

19. A thermal and/or acoustic insulation product comprising mineral fibers as defined in claim 1.

* * * * *

UNITED STATES PATENT AND TRADEMARK OFFICE
CERTIFICATE OF CORRECTION

PATENT NO. : 10,752,537 B2  
APPLICATION NO. : 15/766538  
DATED : August 25, 2020  
INVENTOR(S) : Christopher Ellison Page 1 of 1

It is certified that error appears in the above-identified patent and that said Letters Patent is hereby corrected as shown below:

In the Claims

In Claim 1, please correct the weight percentage for CaO+MgO as follows:

$SiO_2$ 30% to 50%  
$Al_2O_3$ 10% to 20%  
CaO+MgO 25.5% to 35%  
$Na_2O+K_2O$ 1% to 10%

Signed and Sealed this  
Tenth Day of November, 2020

Andrei Iancu  
*Director of the United States Patent and Trademark Office*